United States Patent [19]
Hurley

[11] Patent Number: 5,984,508
[45] Date of Patent: Nov. 16, 1999

[54] SYSTEM, METHOD AND ARTICLE OF MANUFACTURE FOR PRODUCT RETURN OF SOFTWARE AND OTHER INFORMATION

[75] Inventor: John C. Hurley, Sunnyvale, Calif.

[73] Assignee: Aveo, Inc., Santa Clara, Calif.

[21] Appl. No.: 08/878,446

[22] Filed: Jun. 18, 1997

[51] Int. Cl.$^6$ .................................................. G06F 17/22
[52] U.S. Cl. ............................... 364/479.07; 364/479.04
[58] Field of Search ........................ 364/479.04, 479.01, 364/479.02, 479.07; 380/2, 3, 4, 23, 24, 25, 49, 50; 705/26, 35, 39, 44

[56] References Cited

U.S. PATENT DOCUMENTS

| | | | |
|---|---|---|---|
| 4,658,093 | 4/1987 | Hellman | 380/4 |
| 4,688,169 | 8/1987 | Joshi | 364/200 |
| 4,864,494 | 9/1989 | Kobus, Jr. | 380/4 |
| 4,999,806 | 3/1991 | Chernow et al. | 380/4 |
| 5,109,413 | 4/1992 | Comerford et al. | 380/4 |
| 5,166,886 | 11/1992 | Molnar et al. | 364/479 |
| 5,267,171 | 11/1993 | Suzuki et al. | 364/479 |
| 5,287,407 | 2/1994 | Holmes | 380/4 |
| 5,337,357 | 8/1994 | Chou et al. | 380/4 |
| 5,625,690 | 4/1997 | Michel et al. | 380/4 |
| 5,761,308 | 6/1998 | Torii et al. | 380/24 |

OTHER PUBLICATIONS

Patent Application; Serial Number: 08/582611; Inventor: Paul E. Hurley et al. Jan. 3, 1996.

*Primary Examiner*—William Grant
*Assistant Examiner*—Chad Rapp
*Attorney, Agent, or Firm*—Cooley Godward LLP

[57] ABSTRACT

Software allows a vendor to grant full access to demonstration software that has been downloaded to a user's computer as well as return the product for credit. To obtain full access, the user obtains an access code from the vendor, which unlocks the software. To effect a product return, the user would call the customer service department of the manufacturer and talk to a telemarketer or carry out a return session with the vendor's return server. The user reads a serial number to the telemarketer at (204) or supplies the serial number to the return server. The return server uses this number to generate a return authorization code, which is then supplied to the user at (206). The user must then enter this return authorization code into their system at (208). When this code is accepted, the user is shown a confirmation code at (210). The user supplies this code to the vendor for comparison with the code generated on the vendor's system at (212). If the confirmation codes match, the user has correctly entered the return authorization code, and the vendor can issue a credit at (214). The software is then only usable in its demonstration form, or if the demo period is expired, is disabled completely.

17 Claims, 3 Drawing Sheets

SYSTEM, METHOD AND ARTICLE OF MANUFACTURE FOR PRODUCT RETURN OF SOFTWARE AND OTHER INFORMATION

BACKGROUND OF THE INVENTION

1. Field of the Invention

The present invention relates generally to the field of sales of computer software and other digital or analog information. More particularly, in a preferred embodiment, it relates to software that is provided other than by purchase or license of packaged software stored on a physical medium, such as electronically distributed software, i.e. software that is delivered to the customer electronically, rather than through physical distribution methods. Such software can be downloaded from digital data networks such as the Internet, on compact disk read only memory (CD ROM) or floppy, come pre-installed on the hard drive of a computer system, or through broadcast media. Software distributed in such ways other than purchase of the particular packaged software stored on a physical medium is typically provided as a demo copy which can be "unlocked" to give the customer the features of the full product. Most especially, it relates to a system, method and article of manufacture for verifying that a user has disabled software or other digital or analog information that the user wishes to return for credit.

The system, method and article of manufacture can be applied to any type of information which can be purchased using an unlock method, including, but not limited to, software, data, music and video.

2. Description of the Prior Art

Increasingly, manufacturers are distributing software as unlockable demo versions to cut down on distribution costs. This method of distribution causes difficulty when a product needs to be returned, since there is no physical media that can be sent back to the manufacturer to verify that the product is no longer in use.

After a product has been purchased, the customer may decide to return the product. In the case where there is no physical media that can be returned, such as when the demo copy has been unlocked, the vendor must rely on the word of the customer that the software has been removed from their machine. Furthermore, if the customer had been given an access code to unlock the software, a method is needed to prevent re-use of this access code. With credit card purchases, there is not an effective way to refuse to accept a return.

Currently, companies that sell software using this model simply write off losses due to fraudulent returns. This represents a small but significant amount of lost revenue. A need therefore exists for a system and method which will serve as a substitute for returning a packaged software product for credit.

There is a substantial body of prior art relating to various systems and methods for distribution of software and other information that involve the use of access codes to unlock the software, as well as for preventing unauthorized copying of software or other information. The use of such access codes allows demo versions of the software, which actually contain a complete copy of the software, to be made fully functionally upon entry of the access code, which is supplied to the user after payment is made, such as with a credit card. Examples of such systems and methods are disclosed in Hellman, U.S. Pat. No. 4,658,093, issued Apr. 14, 1987; Chernow et al., U.S. Pat. No. 4,999,806, issued Mar. 12, 1991; Holmes, U.S. Pat. No. 5,287,407, issued Feb. 15, 1994 and Chou et al., U.S. Pat. No. 5,337,357, issued Aug. 9, 1994.

In contrast, there appears to be no attention to the reverse problem of insuring that a user of software or other information who wishes to return the software or other information for credit no longer has full access to that software or information. When software or other information is distributed as a package containing the software or other information separately on a physical storage medium, the storage medium containing the software or other information can be returned along with any printed documentation in order to receive the credit.

SUMMARY OF THE INVENTION

Accordingly, it is an object of this invention to provide a confirmed method for a user to effectively return a product that has been purchased electronically or otherwise, without requiring return of a storage medium.

It is a further object of this invention to provide a method of confirming that software that has been returned is not used unless it is repurchased.

It is an object of the present invention to provide a mechanism to allow customers to effectively return electronically distributed software by preventing them from using the software after it has been returned.

Another object is to make it more cost effective for manufacturers to use electronic or other distribution methods that do not require separate packaged physical media for software and other information.

The attainment of these and related objects may be achieved through use of the novel system, method and article of manufacture for product return of software and other information herein disclosed. The present invention provides a system, method and article of manufacture which provides an equivalent to the return of the physical storage medium and is therefore applicable both to packaged software or other information and software or other information that is distributed other than in packaged form. The objects of the present invention are achieved by generating a code, called a return authorization code, that can be entered on a user's system. This code invalidates the previously purchased product on the user's system. Another code is generated on the user's system, which is compared with the code on a vendor system, to provide confirmation to the vendor that the return authorization code has been entered. After this confirmation, the vendor can issue a credit to the user for the return of the product.

A system for product return of software and other information in accordance with this invention has a processor and a memory coupled to the processor. Software or other information is stored in the user data processing system for access by the user. A computer program is stored in the memory and configured to provide, when executed by the processor, a system implemented by the computer program for product return of software or other information. The computer program comprises a first code segment configured to generate a confirmation code that a return code has been entered in the user data processing system in response to the return code in the data processing system. A second code segment is configured to limit access to the software or other information after the return code has been entered in the data processing system.

A method for product return of software and other information to a vendor for credit in accordance with this invention includes entering a return code in a user's data processing system. Access to the software or other information in the user's data processing system is limited in response to entry of the return code. A confirmation code that the return code has been entered in the user's data processing system is generated. The confirmation code is supplied to the vendor to obtain credit for return of the software or other information.

An article of manufacture for return of software and other information to a vendor for credit in accordance with the invention comprises a computer readable storage medium having stored therein a computer program. The computer program includes a first code segment configured to generate a confirmation code that a return code has been entered in the user data processing system in response to the return code in the data processing system. A second code segment is configured to limit access to the software or other information after the return code has been entered in the data processing system.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
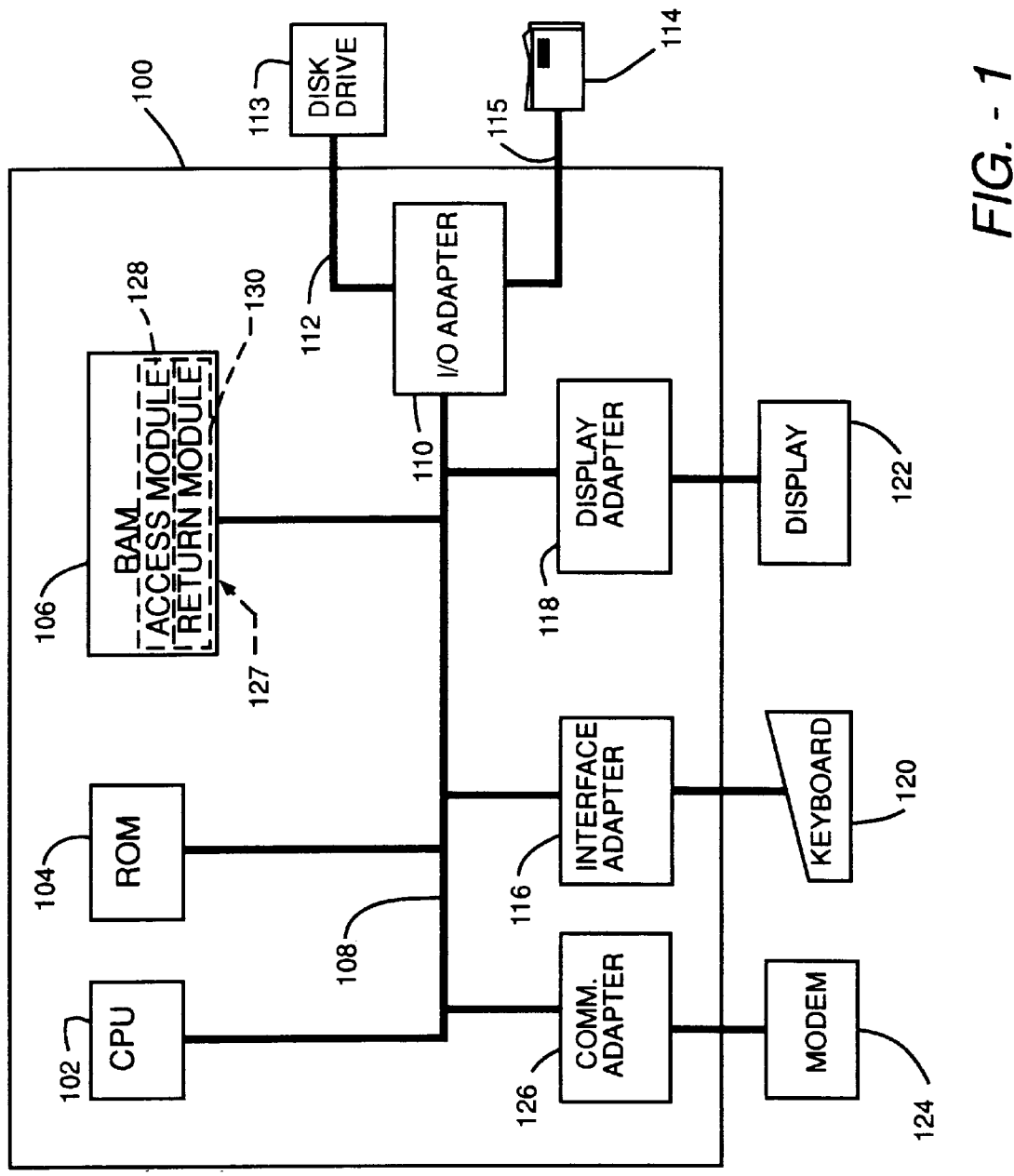
FIG. 1 is a block diagram of data processing system in which the invention is employed.

Turning now to the drawings, more particularly to FIG. 1, there is shown a typical hardware configuration of a computer 100 in accordance with the subject invention. The computer 100 is controlled by a central processing unit 102 (which may be a conventional microprocessor) and a number of other units, all interconnected via a system bus 108, are provided to accomplish specific tasks. Although a particular computer may only have some of the units illustrated in FIG. 1, or may have additional components not shown, most computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral or network devices such as a disk unit 113 and printer 114 to the bus 108, via peripheral bus 112 or cables 115, respectively. A user interface adapter 116 is also provided for connecting input devices, such as a keyboard 120, and other known interface devices including mice, speakers and microphones to the bus 108. Visual output is provided by a display adapter 118 which connects the bus 108 to a display device 122, such as a video monitor. A communications adapter 126 is connected between the bus 108 and a modem 124, to provide the computer 100 with communications capability. The computer has resident thereon and is controlled and coordinated by operating system software such as the Apple Macintosh OS operating system. By way of example, the computer hardware 100 can be: a Apple Power PC Macintosh, a Apple 680xx Macintosh, a PC running Microsoft Windows 95 or a PC running Microsoft Windows NT. As used herein, the term "computer" or "data processing system" is intended to encompass any device with data processing functionality, for example, provided with one or more microprocessors.

When configured in accordance with the invention, the computer 100 has a security engine 127 loaded into its RAM 106. The security engine 127 includes at least an access module 128 and a return module 130, which respectively operate in a vendor's computer 100 to provide an access code which a user enters into their computer 100 to cause the access module 128 on the user's computer to provide access to all the features of a demo program that has been installed on the user's computer 100 and to generate return and confirmation codes in operation of the invention. The security engine 127 on the vendor's computer 100 operates in a somewhat different manner than the security engine 127 on the user's computer 100, but the diagrammatic representation of the two computers is the same, so only a single computer 100 has been shown in the drawings. The two computers 100 communicate through their respective communications capabilities, which may be implemented with modems 124 as shown, with dedicated Internet connections, cable or microwave communications, or other suitable communication medium between computers. The operation of the security engines 127 on the vendor's computer 100 and on the user's computer 100 is explained with FIG. 2.

In addition to general purpose computers as described above, the invention can be used with various special purpose systems incorporating microprocessors or other data processing capabilities. By way of example, a smart video disc player or Web television device can have a storage area for downloaded videos. Again, by going through an entirely automatic process, the customer can download a video, then return it. As long as a form of persistent storage for access codes and blacklist or other access revoking routines is maintained, the return mechanism can be employed. The persistent storage can be maintained either locally or at the vendor site.

A video player implementation is particularly able to implement a high security version of the invention. If a downloaded video is coded so that it will only run on a video player with a particular burned-in serial number, it is possible to verify definitively that the return code was entered on that player. This approach is not as feasible with microcomputers, since few manufacturers supply their machines with a burned-in serial number, and customers expect to be able to move their purchased software from machine to machine.

A serial number is a number generated on the user's system 100 that uniquely identifies the user's system. This number is provided to the vendor when placing an order to purchase, or to return the product, shown in FIG. 2 at 200 and 202, respectively. Other data may be encoded in the serial number to provide more information to the vendor. There are numerous ways to create a serial number for a machine, known to those skilled in the art. The serial number does not have to be unique, but could combine specific information about the user's system 100 with a random element.

An access code is a number generated on the vendor's system 100, desirably from information from the serial number, and includes information on which products and features to unlock, as well as other information to ensure its validity. This number is provided by the vendor to the user upon purchase of a product, and serves to unlock the products or features purchased. The use of such access codes for unlocking products or features purchased is conventional.

Figure 2:
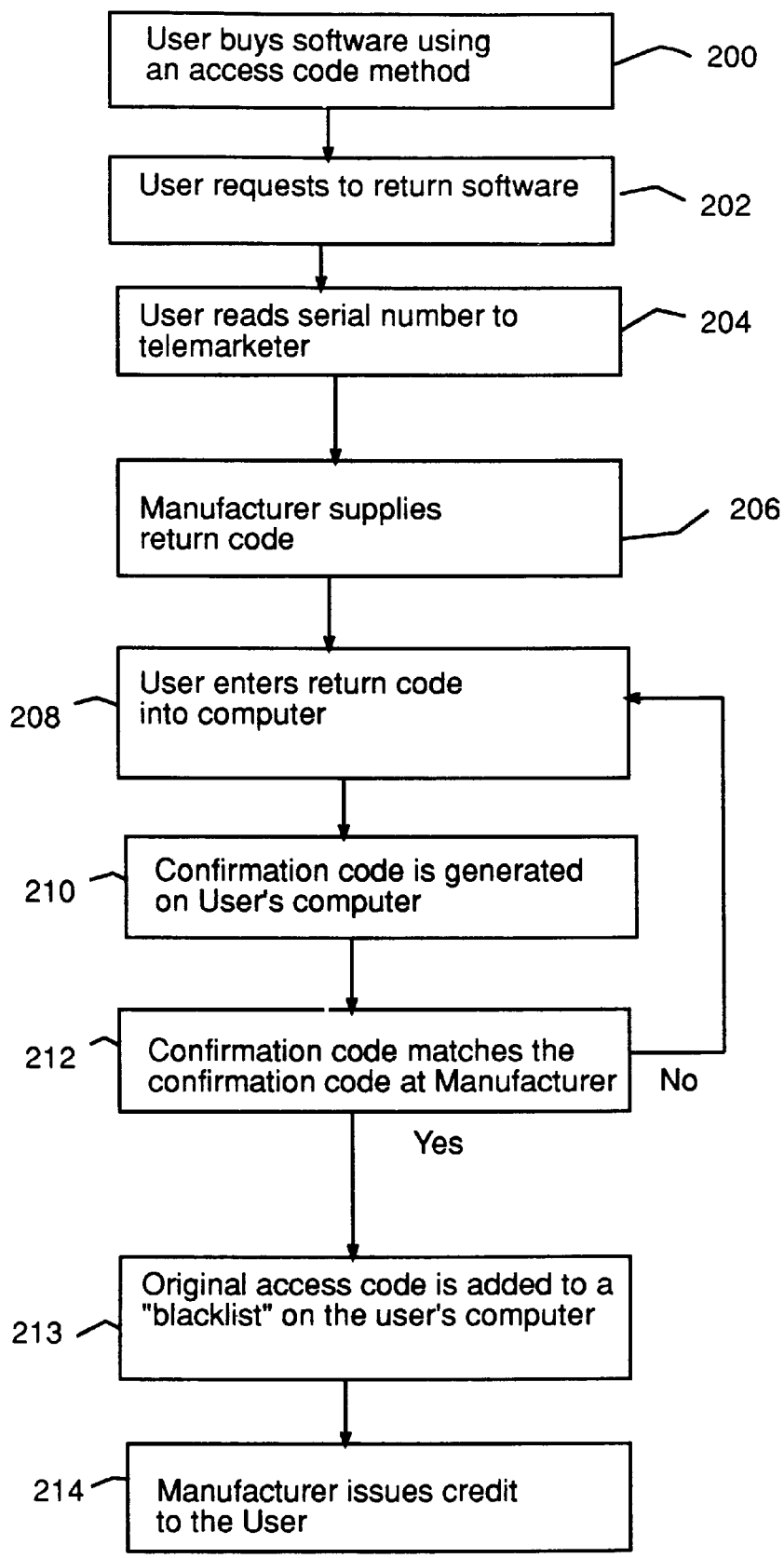
FIG. 2 is a flow chart illustrating the method employed by the manufacturer to effect a return using the present invention.

A return authorization code is a number that is generated on the vendor's system 100 using information from the serial number, which in FIG. 2 is supplied by the user to the vendor at 204 while executing the return. Alternatively, the vendor could obtain the serial number from a database entry created during the order to purchase the software. The vendor supplies the return authorization code to the user at 206. When the return authorization code number is entered into the user's system 100 at 208, the return module 130 (FIG. 1) will then generate and display a confirmation code at 210, described below.

The confirmation code is a number that can be generated on both the users and vendor's systems. The confirmation code is displayed to the user only after the user has entered the return authorization code into their system. This number ensures the vendor that the return authorization code has really been entered into the user's system. In the preferred embodiment, an encrypted portion of the serial number is used as the confirmation code, since this number is available on both systems.

To effect a product return in one embodiment, the user would call the customer service department of the manufacturer or other vendor and talk to a telemarketer. The user reads the serial number to the telemarketer at 204. The telemarketer uses this number to generate a return authorization code, which is then read back to the user at 206. The user must then enter this return authorization code into their system at 208. When this code is accepted, the user is shown a confirmation code at 210. The user reads this code to the telemarketer, who compares it with the code generated on the vendor's system at 212. If the confirmation codes match, the user has correctly entered the return authorization code, the return module 130 enters the current access code into a "blacklist" in a file on the user's system at 213. The telemarketer then issues a credit at 214.

In another embodiment, the product return function is provided in an automatic, electronic implementation. For example, the customer can click on a "return product" button in the product, which causes the product to call the vendor return server via modem or other communications medium, and do the whole return process in an automated fashion in a return session with the vendor return server. The return session also carries out the steps shown in FIG. 2, but without requiring human intervention at the vendor.

Figure 3:
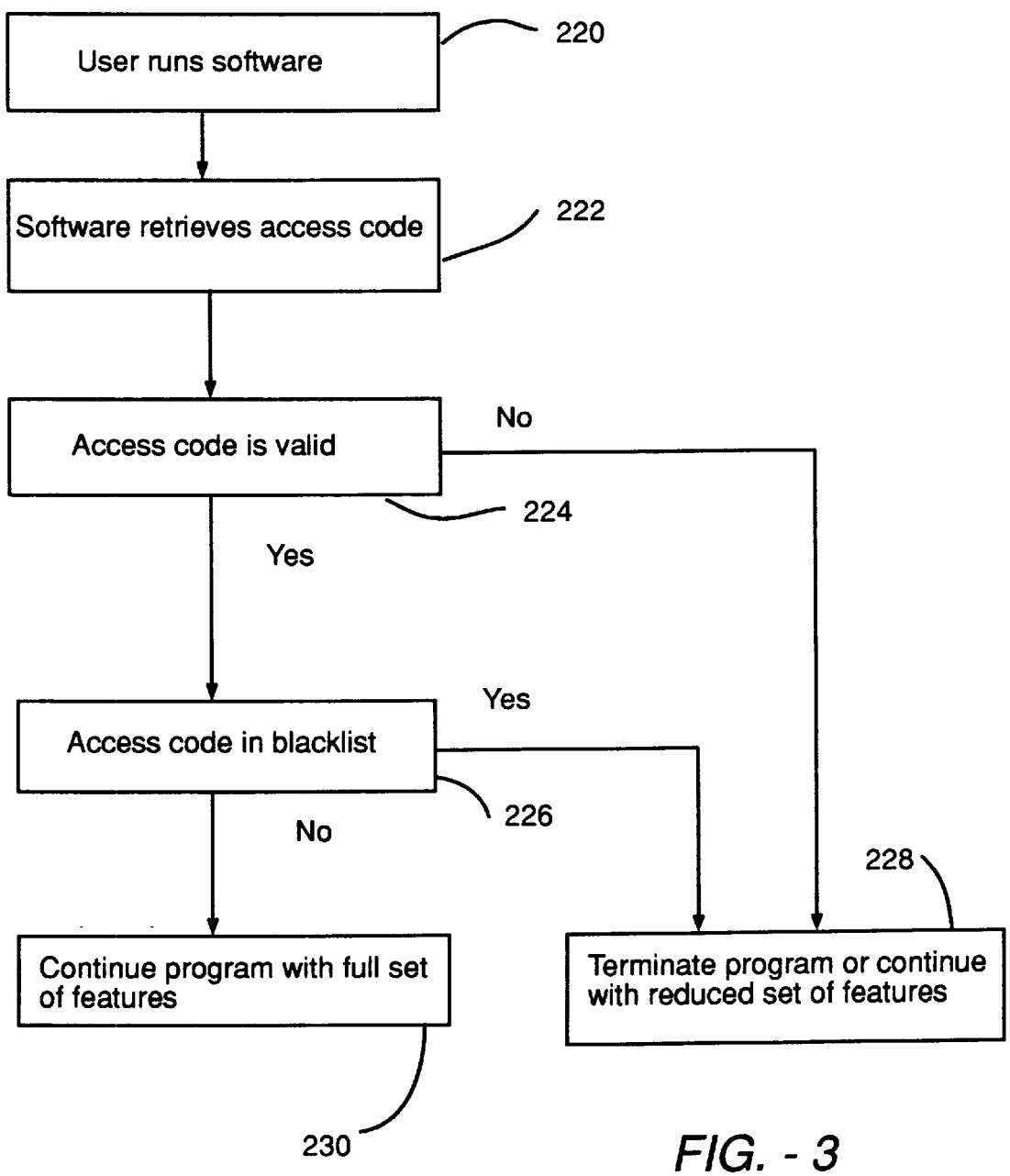
FIG. 3 is a flow chart illustrating the operation of the program in the preferred embodiment.

As shown in FIG. 3, after the return authorization code has been entered, when the user runs the returned software at 220, the access module 128 on the user's system must verify that an access code is correct at 222 and 224 and check the blacklist at 226 each time. If the access code is invalid or on the blacklist, the returned software is terminated or continued with a reduced feature set at 228. If the access code is valid and not in the blacklist, the software is continued with the full set of features at 230. This prevents the user from re-entering the original access code after the product return process.

The invention can be employed for the return of any software or other information. While it has been described above in an implementation for software that has been purchased with an unlock method, it could also be employed with suitable modification for software that is purchased in packaged form on a separate storage medium. In practice, the invention is desirably implemented with the computer controlled telephony software that is the subject matter of commonly assigned Paul E. Hurley et al., application Ser. No. 08/582,611, entitled "System, Method and User Interface for Computer Controlled Telephony," filed Jan. 3, 1996, the disclosure of which is incorporated by reference herein in its entirety.

It should now be readily apparent to those skilled in the art that a novel system, method and article of manufacture for product return of software and other information capable of achieving the stated objects of the invention has been provided. The system, method and article of manufacture of this invention provides a confirmed method for a user to effectively return a product that has been purchased electronically or otherwise, without requiring return of a storage medium. The invention provides a method of confirming that software that has been returned is not used unless it is repurchased. The invention provides a mechanism to allow customers to effectively return electronically distributed software by preventing them from using the software after it has been returned. The invention makes it more cost effective for manufacturers to use electronic or other distribution methods that do not require separate packaged physical media for software and other information.

It should further be apparent to those skilled in the art that various changes in form and details of the invention as shown and described may be made. It is intended that such changes be included within the spirit and scope of the claims appended hereto.

What is claimed is:

1. A user data processing system having:
   a processor;
   a memory coupled to the processor;
   software or other information stored in the user data processing system for access by the user; and
   a computer program stored in the memory and configured to provide, when executed by the processor, a system implemented by the computer program for product return of software or other information, the computer program comprising:
   a first code segment configured to generate, within the user data processing system, in response to entry of a return code in the user data processing system, a confirmation code that the return code has been entered in the user data processing system; and
   a second code segment responsive to entry of the return code in the user data processing system and configured to limit access to the software or other information after the return code has been entered in the user data processing system.

2. The user data processing system of claim 1 in which the system implemented by the computer program is further for granting access to the software or other information, the computer program additionally comprising:
   a third code segment configured to grant access to the software or other information in response to entry of an access code in the user data processing system.

3. A system for returning software or other information for credit, comprising, in combination:
   the user data processing system of claim 2;
   a vendor data processing system having:
   a processor;
   a memory coupled to the processor; and
   a vendor computer program stored in the memory and configured to provide, when executed by the processor together with execution of the computer program on the user data processing system, a system for product return of software or other information, the vendor computer program comprising:

a fourth code segment configured to generate, within the vendor data processing system, in response to entry of the return code in the vendor data processing system, a confirmation code that the return code has been entered in the user data processing system; and a fifth code segment configured to compare the confirmation code supplied by the user with the confirmation code generated by the vendor data processing system to confirm that the return code has been entered in the user data processing system.

4. The system for returning software or other information for credit of claim 3 in which the user data processing system is coupled to the vendor data processing system.

5. The system for returning software or other information for credit of claim 3 in which the system is further for providing access to the software or other information, the vendor computer program additionally comprising:

a sixth code segment configured to generate the access code for granting access to the software or other information in response to entry of the access code in the user data processing system.

6. The system for returning software or other information for credit of claim 5 in which the vendor computer program additionally comprises:

a seventh code segment configured to generate the return code for entry in the user data processing system for returning the software or other information for credit.

7. The system for returning software or other information for credit of claim 6 in which the second code segment is configured to place the access code in a blacklist in the user data processing system after entry of the return code in the user data processing system and to check the blacklist for the access code when an attempt is made to run the software or access the information on the user data processing system by entry of the access code after entry of the return code.

8. A system allowing software or other information to be returned for credit, comprising a vendor data processing system having:

a processor;

a memory coupled to the processor; and a vendor computer program stored in the memory and configured to provide, when executed by the processor, a system for product return of software or other information, the vendor computer program comprising:

a first code segment configured to generate, within the vendor data processing system, a confirmation code that a return code has been entered in a user data processing system;

a second code segment configured to compare a confirmation code supplied by the user with the confirmation code generated by the vendor data processing system to confirm that the return code has been entered in the user data processing system;

a third code segment configured to generate, in the vendor data processing system, an access code for granting access to the software or other information in response to entry of the access code in the user data processing system; and a fourth code segment configured to generate, in the vendor data processing system, the return code for entry in the user data processing system for returning the software or other information for credit.

9. The system for allowing software or other information to be returned for credit of claim 8 in which the first code segment is configured to generate the confirmation code in response to entry of a user supplied serial number in the vendor data processing system.

10. A method for the return of software or other information that has been installed on a user's data processing system to a vendor for credit, which comprises:

(a) entering a return code in the user's data processing system;

(b) limiting access to the software or other information in the user's data processing system in response to entry of the return code in the user's data processing system;

(c) generating, within the user's data processing system, a confirmation code that the return code has been entered in the user's data processing system; and (d) supplying the confirmation code to the vendor to obtain credit for return of the software or other information.

11. The method for the return of software or other information for credit of claim 10 in which the method is further for granting access to the software or other information, the method additionally comprising:

(e) entering an access code in the user's data processing system to obtain access to the software or other information.

12. The method for the return of software or other information for credit of claim 11 additionally comprising:

prior to entering the return code, entering an access code in the user's data processing system to enable access to the software or other information; and (f) placing the access code in a blacklist in the user's data processing system after entry of the return code in the user's data processing system; and (g) checking the blacklist for the access code when an attempt is made to run the software or access the information on the user's data processing system by entry of the access code after entry of the return code.

13. The method for the return of software or other information for credit of claim 11 additionally comprising:

(f) generating a confirmation code at a vendor data processing system; and (g) comparing the confirmation code generated at the user's data processing system with the confirmation code generated at the vendor data processing system to confirm that the return code has been entered in the user's data processing system.

14. An article of manufacture for the return of software or other information to a vendor for credit, which comprises a computer readable storage medium having stored therein a computer program, the computer program including:

a first code segment configured to generate, within a user data processing system, in response to entry of a return code in the user data processing system, a confirmation code that the return code has been entered in the user data processing system; and a second code segment responsive to entry of the return code in the user data processing system and configured to limit access to the software or other information after the return code has been entered in the user data processing system.

15. The article of manufacture for the return of software or other information to a vendor for credit of claim 14 in which the system implemented by the computer program is further for granting access to the software or other information, the computer program additionally comprising:

a third code segment configured to grant access to the software or other information in response to entry of an access code in the user data processing system.

16. An article of manufacture allowing the return of software or other information to a vendor for credit, which comprises a computer readable storage medium having stored therein a computer program, the computer program including:
- a first code segment configured to generate, in a vendor data processing system, a confirmation code that a return code has been entered in a user data processing system;
- a second code segment configured to compare a confirmation code supplied by the user with the confirmation code generated by the vendor data processing system to confirm that the return code has been entered in the user data processing system;
- a third code segment configured to generate, in the vendor data processing system, an access code for granting access to the software or other information in response to entry of the access code in the user data processing system; and
- a fourth code segment configured to generate, in the vendor data processing system, the return code for entry in the user data processing system for returning the software or other information for credit.

17. The article of manufacture allowing the return of software or other information to a vendor for credit of claim 16 in which the first code segment is configured to generate the confirmation code in the vendor data processing system in response to entry of a user supplied serial number in the vendor data processing system.

* * * * *